Patented Dec. 2, 1952

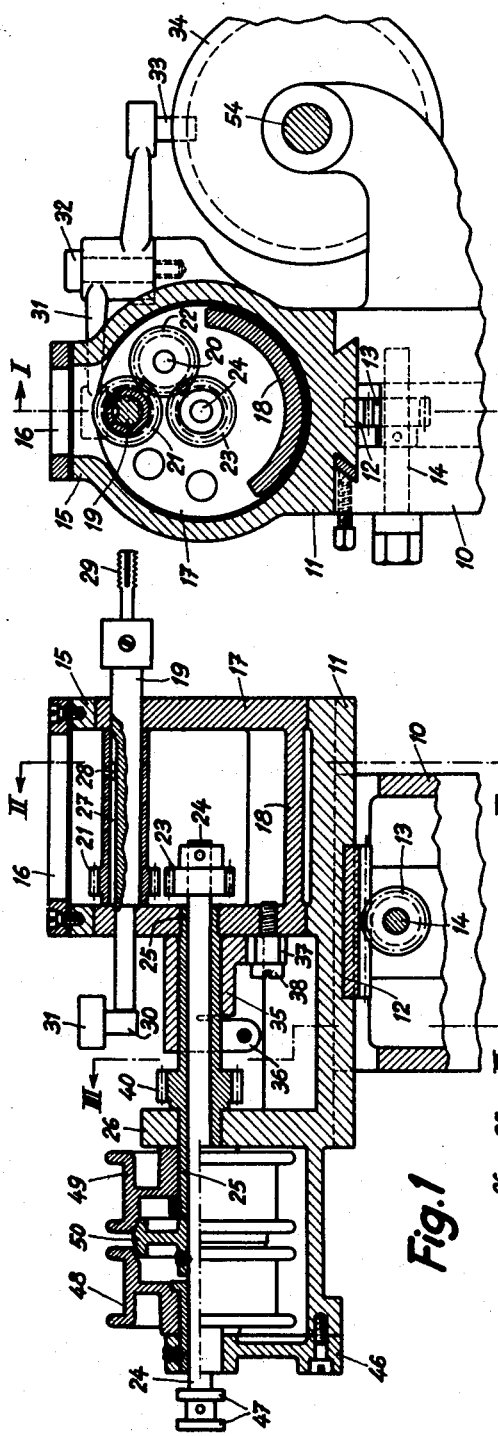

2,619,711

UNITED STATES PATENT OFFICE 2,619,711

ACCESSORY FOR AUTOMATIC LATHES

André Bechler, Moutier, Switzerland

Application September 20, 1946, Serial No. 698,197
In Switzerland May 3, 1946

1 Claim. (Cl. 29—41)

The present invention relates to an accessory for automatic lathes comprising a sliding tailstock, on which a revolvable turret containing tool holders, a mechanism for bringing the said tool holders into position as each tool is required, and a means for driving the tools, are mounted.

The turret consists preferably of two cheeks united by a sector piece of a hollow cylinder, these cheeks being adjusted within the tailstock. A detachable transparent cover-plate closes the open roof of the latter. The tools are moved into operating position through the medium of a hollow indexing shaft supported by one of the cheeks of the revolvable turret and by a bearing whose purpose is also to take the radial pull of the transmission gear. The indexing shaft is coupled to the turret carrying the tool holders by means of a coupling sleeve clamping on the spindle.

The drawing shows, by way of example, an accessory for automatic lathes according to the present invention.

Fig. 1 is a side-elevation of the accessory in section along the line I—I in Fig. 2.

Fig. 2 is an end-elevation of the same along the line II—II in Fig. 1.

Fig. 3 is an end-elevation of the same with a portion in section along the line III—III in Fig. 1.

Fig. 4 is an end-view of a coupling sleeve showing the forked portion for attachment to the cradle.

Fig. 5 is a similar view of the opposite end of the sleeve showing the clamping collar for securing the sleeve to the hollow indexing shaft.

With respect to the figures on the drawing showing an accessory having four tool-holders, two of which are rotatable and can be utilized for interior screw-cutting, or for drilling holes of different size, for example, 10 denotes the bed supporting the accessory. The sliding tailstock 11 with dove-tail guide can be adjusted on the inset plate 12 fitted with a rack and pinion 13, which can be actuated by a hexagonal gudgeon head 14. The front part of the sliding tailstock is formed by a cylindrical casing 15 open at the top from one end to the other with detachable cover 16 of transparent material. The cheeks 17 revolve concentrically inside the end portions of the turret, and are united by a sector piece of a hollow cylinder 18. These cheeks form the bearing for the tool-holders 19, 20 which can be driven through the pinions 21 and 22 meshing with a pinion 23 keyed to the live spindle or driving shaft 24. The latter runs through the main part of the accessory into the hollow of the turret within a hollow indexing shaft 25 extending beyond the bearing 26 cast integral with the sliding tailstock.

The tool holder 19 is coupled to the hub of the pinion 21 by means of a feather key 28, which is a sliding fit in a key-way 27 in the tool holder, permitting longitudinal motion of the tool holder for tapping with the tool 29.

The back extension piece of the tool holder rests against the pin 30 in the end of the lever 31 pivoted at 32 having its other arm, carrying a follower-pin 33, riding on the lateral contour of a cylinder cam 34 of known construction. At a given moment the cam causes the tap 29 to advance into the bore to cut the thread.

The turret with tool-holders is coupled to the indexing shaft 25 by means of a sleeve 35 with clamping collar 36 (see Fig. 5), which is also provided with a forked flange 37 through which a screw-bolt 38 is inserted. This device permits independent adjustment of the tool-holder with respect to the work, on the one hand, and of the indexing shaft 25 with respect to the cam directing it, on the other. The indexing shaft 25 has a pinion 40 meshing with a sector gear 41 carried at the extremity of a lever 42. The other extremity of this lever presses, through the medium of a follower-beak 43, on to the cam 45. The lobes of the latter act through the medium of the pinion 40, mounted on the indexing shaft 25 and the sleeve 35, in order to vary periodically the disposition of the turret with tool-holders, thus bringing any of the various tool holders into alignment with the head-stock spindle.

The live spindle 24 is supported by an adjustable bearing 46 and carries at its extremity near to the said bearing a grooved guide-wheel 47 in which a pin of a cam device not represented can move with a view to sliding the live spindle periodically along its axis with the purpose of throwing one or the other of the pulleys 48, 49, turning at different speeds, into gear. The coupling of the respective parts is effected by the known means of a double-cone 50, fixed to the spindle 24, which can engage with one or the other of the afore-mentioned pulleys by sliding this spindle 24 axially in its bearings.

The tapping operation is effected under the control of the follower-pin 30 in connection with the tool-holder in working position. The operation finished, and the drill or tap, respectively, back away from the hole, one of the cam lobes 45 acts on the lever 42, revolving the turret 17, 18 in the adjustment formed by the end portions of the casing, so as to move another tool holder into alignment with the headstock spindle. Dependent on the direction of the thread (left or right threaded screw), the tool holder must either be turned quicker, or in the opposite direction as the piece of work, in order to take out the tool from the latter, such as is done in usual practice. This can be done in the present case by engaging the live spindle with one or the other of the pulleys, 48 or 49, so that a tool holder can be rotated through the pinions 23, 22 and 21, in the required sense.

What I claim is:

In an accessory for automatic lathes, a tailstock made to be adjustable on the slideway of a lathe in a direction parallel to the turning axis of this lathe and having a fore, a middle and a rear portion, a gear means mounted on said tailstock in a manner to be engaged by an adjusting gearing of the lathe, a hollow, substantially drum-shaped turret at said fore portion, a hollow indexing shaft at said middle portion, a driving shaft being located at said middle and rear portions and passing through said indexing shaft, said turret, indexing shaft and driving shaft being rotatably mounted on said tailstock around a common axis parallel to the turning axis of the lathe, a driver fixed to said turret, a sleeve being angularly adjustably fixed to said indexing shaft and having a forked flange receiving said driver, a pinion integral with said indexing shaft, an indexing cam, a spring loaded lever having a middle portion pivotally mounted on said tailstock, a toothed segment-shaped end meshing with said pinion, and another end engaging said indexing cam, a plurality of tool holder means mounted on said turret axially movable independently of one another and with their axes at a distance from said common axis equal to that of said common axis from the turning axis of the lathe, a reciprocating cam, a second lever being pivotally mounted on said tailstock and operatively connecting said reciprocating cam with said tool holders when in working position, at least one of said tool holder means being revolvable around its axis, means inside said turret, comprising gears and operatively connecting said driving shaft with the revolvable tool holder means in any axial position, two axially fixed driving pulleys being loosely mounted on said rear portion and constituting driving friction coupling parts, a disc being located between said driving pulleys, fixed to said driving shaft shiftable in axial direction, and constituting a driven friction coupling part, and means for shifting said driving shaft to operatively connect it with one of said pulleys.

ANDRÉ BECHLER.

REFERENCES CITED

The following references are of record in the file of this patent:

UNITED STATES PATENTS

| Number | Name | Date |
| --- | --- | --- |
| 1,810,227 | Shea | June 16, 1931 |
| 2,229,701 | Jelinek et al. | Jan. 28, 1941 |
| 2,348,363 | Ruppel | May 9, 1944 |
| 2,348,364 | Ruppel | May 9, 1944 |
| 2,378,923 | Honegger | June 26, 1945 |

FOREIGN PATENTS

| Number | Country | Date |
| --- | --- | --- |
| 11,686 | Great Britain | Feb. 4, 1915 |
| 685,111 | Germany | Dec. 12, 1939 |